July 5, 1966
H. BOCHE ETAL
3,259,051
VENTILATING SYSTEM FOR THE PASSENGER COMPARTMENT
OF MOTOR VEHICLES
Filed May 18, 1964
2 Sheets-Sheet 1
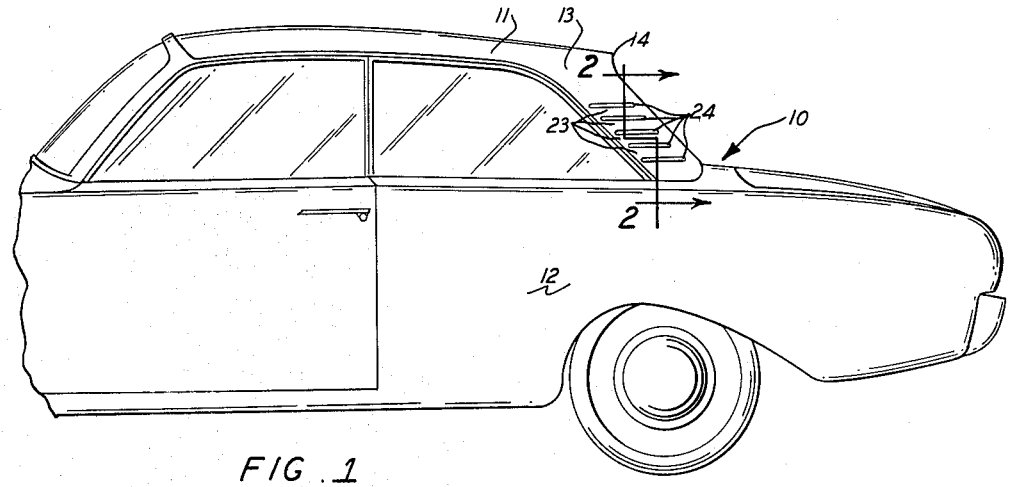
FIG. 1
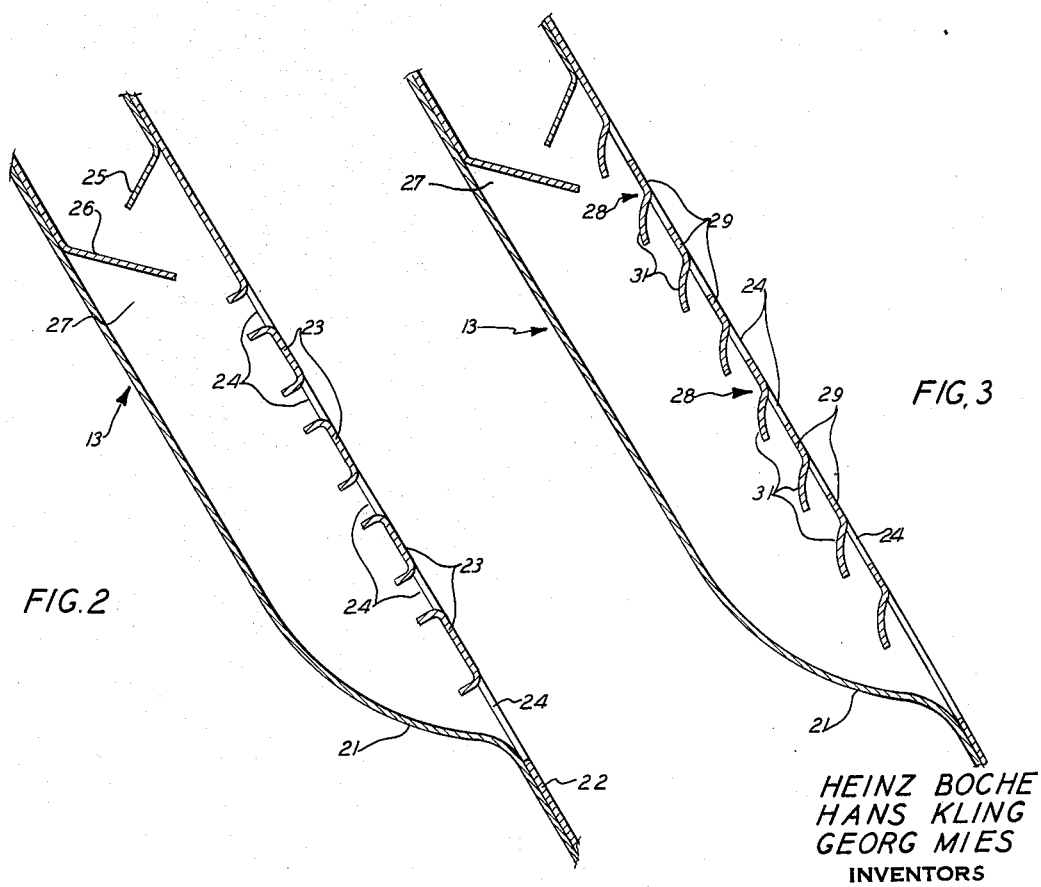
FIG. 2
FIG. 3
HEINZ BOCHE
HANS KLING
GEORG MIES
INVENTORS
BY John R. Faulkner
John J. Boethel
ATTORNEYS July 5, 1966 H. BOCHE ETAL 3,259,051
VENTILATING SYSTEM FOR THE PASSENGER COMPARTMENT
OF MOTOR VEHICLES
Filed May 18, 1964 2 Sheets-Sheet 2

HEINZ BOCHE
HANS KLING
GEORG MIES
INVENTORS

BY John R. Faulkner
John J. Goethel

ATTORNEYS

United States Patent Office 3,259,051
Patented July 5, 1966

3,259,051
VENTILATING SYSTEM FOR THE PASSENGER COMPARTMENT OF MOTOR VEHICLES
Heinz Boche, Cologne-Dellbruck, Hans Kling, Cologne-Lindenthal, and Georg Mies, Bergisch-Gladbach, Germany, assignors to Ford Motor Company, Dearborn, Mich., a corporation of Delaware
Filed May 18, 1964, Ser. No. 368,293
Claims priority, application Germany, May 20, 1963, F 39,795
7 Claims. (Cl. 98—2)

This invention relates to a ventilation system for the passenger compartment of a motor vehicle.

According to the present invention, air ducts are constructed and arranged to connect the interior of the passenger compartment of a vehicle with the atmosphere through either one or several exhaust openings. These air ducts are positioned preferably above the rear window of the vehicle and are connected with the interior of the C-pillars supporting the body roof structure. The exhaust openings are located in the outer panels of the C-pillars and preferably extend in a horizontal direction.

Baffle plates are arranged preferably in the upper part of the C-pillar interior to prevent water from entering the passenger compartment through the air ducts. The inner and outer panels of the C-pillar are connected beneath the lowest exhaust openings to provide a trough for water drainage through the lowest opening.

The air inlet openings are arranged to provide an air flow path from the vehicle interior that causes the exhaust air to flow over the surface of the vehicle rear window. This flow of exhaust air over the rear window causes a quick demisting action of the windowpane when required to permit clear rearview vision for the vehicle operator.

The location of the exhaust openings at the C-pillar of the vehicle body has the advantage that the air pressure within the passenger compartment can be maintained approximately constant independently of the effects of the speed of the vehicle. This construction minimizes wind noise and does not adversely affect the drag coefficient of the vehicle.

Other objects, features and advantages of the invention will become apparent upon reference to the succeeding description and to the drawings, wherein:

FIG. 1 is a fragmentary side elevation of a rear portion of a vehicle body having a ventilation system embodying the present invention;

FIG. 2 is a fragmentary section through the C-pillar of the vehicle body taken on the line 2—2 of FIG. 1;

FIG. 3 is a view in part similar to FIG. 2 showing a second embodiment of the present invention;

Figure 5:
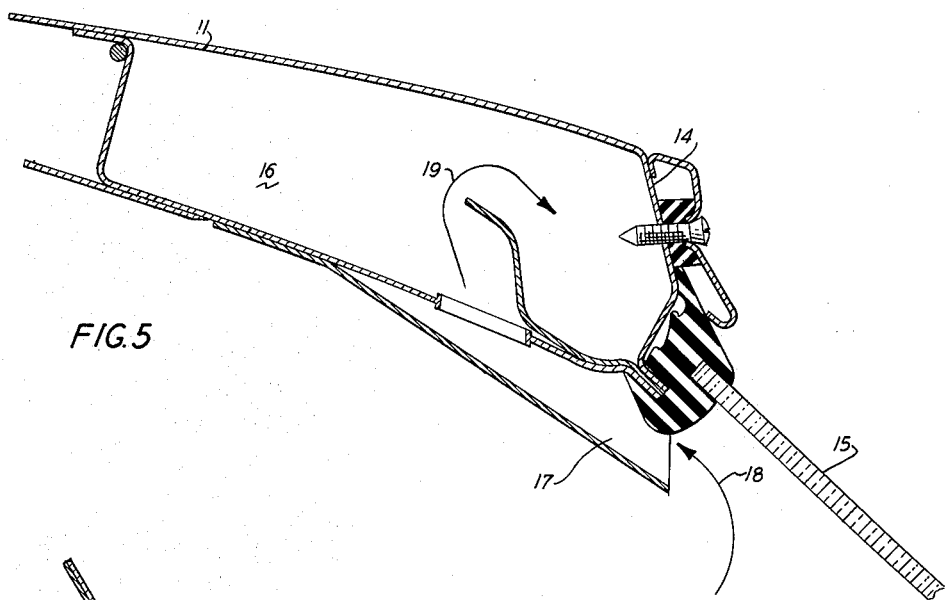
FIG. 5 is a fragmentary longitudinal section through the roof structure and the rear window.

Referring now to the drawings there is shown a portion of a vehicle body, generally designated 10, having a roof structure 11 supported on the lower rear body structure 12 by hollow pillar structures 13, only one of which can be seen in FIG. 1. The pillars 13 may hereinafter be referred to as the C-pillars, as they are commonly known to vehicle body engineers. As in a conventional vehicle body design, the C-pillars 13 and the rear edge portion 14 of the roof structure 11 form part of the framework for the vehicle body rear window 15 (see FIG. 5).

According to the present invention, the roof structure 11 has a laterally extending exhaust duct 16 which extends from C-pillar to C-pillar across the top of the rear window 15. This exhaust duct 16 is in communication with the passenger compartment through rearwardly facing openings 17. The air from the passenger compartment enters the exhaust duct by following the path generally indicated by the arrows 18 and 19. It will be noted from the arrow 18 that the air wipes across the inner surface of the rear window 15. As will be readily understood, this air movement across the inner surface of the rear window 15 has the advantage that it materially assists in the demisting or the defogging of the rear window when required, thus providing clear rearview vision for the vehicle operator.

The exhaust duct 16 is in communication at each of its ends with the interior of the hollow C-pillars 13. As shown in FIG. 2, each C-pillar may comprise an inner body panel member 21 and an exterior or outer body panel member 22. The outer body panel 22 is provided with a series of louvers 23 which in the embodiment of FIG. 2 comprise inwardly facing U-shaped channel sections extending in a substantially horizontal direction, the channel sections being separated by openings 24.

Baffle plates 25 and 26 are arranged in the upper part of the interior 27 of each C-pillar 13. The baffle plates 25 and 26 prevent any water that might be splashed against the side of the vehicle in a generally upward direction from carrying over into the exhaust duct 16 from which it could spill into the passenger compartment. The inner panel 21 is shown contoured at its bottom to meet with the panel 22 to provide a spill-way or trough through the lowermost opening 24 for any water that may run down the side slopes of the vehicle body roof structure, the water thus being drained to the exterior surface of the vehicle body.

Figure 4:
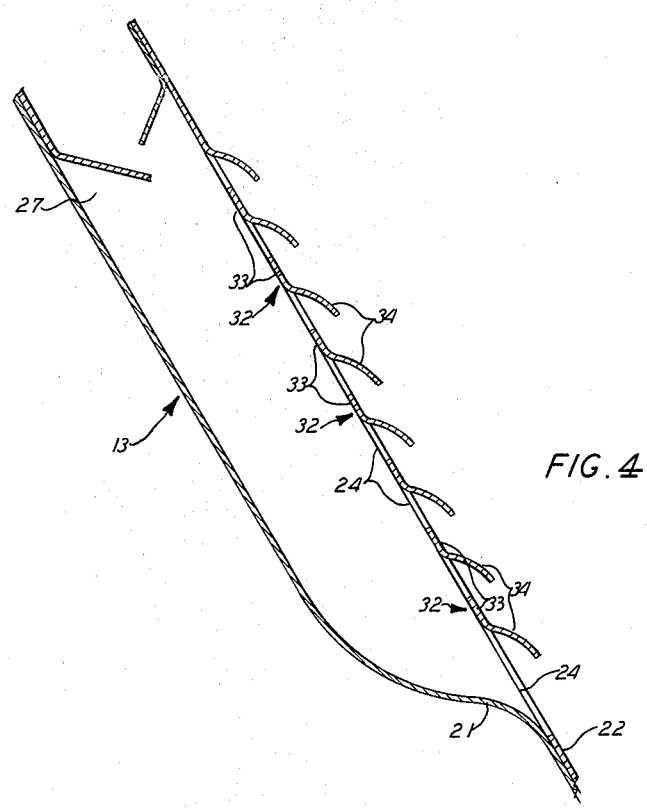
FIG. 4 is a view in part similar to FIG. 2 showing yet another embodiment of the present invention.

FIGS. 3 and 4 of the drawings show alternative forms which the louvers may take. In FIG. 3 the louvers 28 are shown having flat sections 29 that lie in a plane of the exterior panel of the vehicle body and inwardly curved deflecting surfaces or sections 31. In FIG. 4, the louvers 32 are shown with the flat sections 33 lying in the plane of the vehicle body and with the curved appendage portions 34 directed outwardly of the vehicle body surface.

As is known, the area of the C-pillars is a low pressure area when the vehicle is under motion. The arrangement embodying the present invention thus provides a ventilation system in which the air pressure in the passenger compartment can be kept approximately constant independently of the effect at the speed of the vehicle. The vehicle may be operated with the windows closed, thus eliminating external noises and the entry of foreign material into the vehicle body compartment. The location of the exhaust louvers in the C-pillars has the further advantage that the drag coefficient of the vehicle is not increased.

It will be understood that the invention is not to be limited to the exact construction shown and described, but that various changes and modifications may be made without departing from the spirit and scope of the invention, as defined in the appended claims.

We claim:
1. In a motor vehicle body having a passenger compartment, a roof structure, pillars supporting said roof structure at the rear thereof, and a rear window located beneath the rear edge of said roof structure and extending transversely of said vehicle body between said pillars;
    a ventilation system comprising an exhaust duct within said roof structure extending laterally thereacross above said window,
    air inlet openings providing communication between said passenger compartment and exhaust duct,
    at least one of said pillars having spaced interior and exterior walls forming a chamber therein in communication with said exhaust duct,
    at least one baffle being provided at the top of said chamber to prevent water carry-over from said chamber into said exhaust duct,
and openings in said exterior wall placing said chamber in communication with the atmosphere,
said air inlet openings, exhaust duct, pillar chamber and exterior wall openings providing for exhaust air flow from said passenger compartment to the atmosphere.

2. In a motor vehicle body according to claim 1 in which the openings in the exterior wall of said pillar extend in a substantially horizontal direction.

3. In a motor vehicle body according to claim 2 in which the interior panel is attached directly below the lowest of said openings to said exterior wall to provide a drainage trough from said chamber.

4. In a motor vehicle body according to claim 3 in which said air inlet openings face rearwardly causing the air flow to be over the interior surface of the rear window before entering the exhaust duct.

5. In a motor vehicle body according to claim 1 in which the interior panel is attached directly below the lowest of said openings to said exterior wall to provide a drainage trough from said chamber.

6. In a motor vehicle body according to claim 5 in which said air inlet openings face rearwardly causing the air flow to be over the interior surface of the rear window before entering the exhaust duct.

7. In a motor vehicle body according to claim 1 in which said air inlet openings face rearwardly causing the air flow to be over the interior surface of the rear window before entering the exhaust duct.

References Cited by the Examiner
UNITED STATES PATENTS
3,059,561   10/1962   Wilfert _____ 98—2

MEYER PERLIN, *Primary Examiner.*